United States Patent [19]

Morgan et al.

[11] 3,773,220

[45] Nov. 20, 1973

[54] METERING APPARATUS

[76] Inventors: Everett V. Morgan, 4816 5th Ave. South; Robert W. Haynes, c/o Haynes & Morgan Chemicals, Inc.; Gordon F. Schmidt, 1118 10th Ave. S.W., all of Great Falls, Mont. 59401

[22] Filed: May 15, 1972

[21] Appl. No.: 253,543

[52] U.S. Cl. .................. 222/48, 222/227, 222/231, 222/504
[51] Int. Cl. ............................................ G01f 11/00
[58] Field of Search ...................... 222/48, 129, 145, 222/227, 228, 231, 317, 504; 141/256, 257

[56] References Cited
UNITED STATES PATENTS

| | | | |
|---|---|---|---|
| 490,631 | 1/1893 | Ransome | 222/137 |
| 1,812,911 | 7/1931 | Walter | 222/231 |
| 1,996,044 | 3/1935 | Green | 222/231 |
| 3,474,937 | 10/1969 | Frey | 222/231 |

FOREIGN PATENTS OR APPLICATIONS

| | | | |
|---|---|---|---|
| 448,567 | 5/1948 | Canada | 222/230 |

*Primary Examiner*—Robert B. Reeves
*Assistant Examiner*—Frederick R. Handren
*Attorney*—John W. Malley et al.

[57] ABSTRACT

The subject matter of the invention is an improved metering apparatus for a hopper mechanism. The hopper mechanism is attached to a conveyor carrying dry bulk material. The improvement of the instant invention over conventional metering devices is in the automatic and accurate dispensing of dry treatment substances to the material being conveyed. In particular, the apparatus detects the movement of the conveyor and is so synchronized to this movement that automatic and accurate dispensing is achieved.

7 Claims, 6 Drawing Figures

PATENTED NOV 20 1973 3,773,220

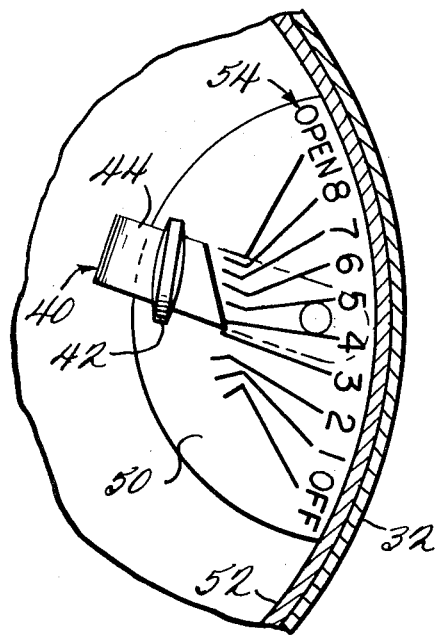
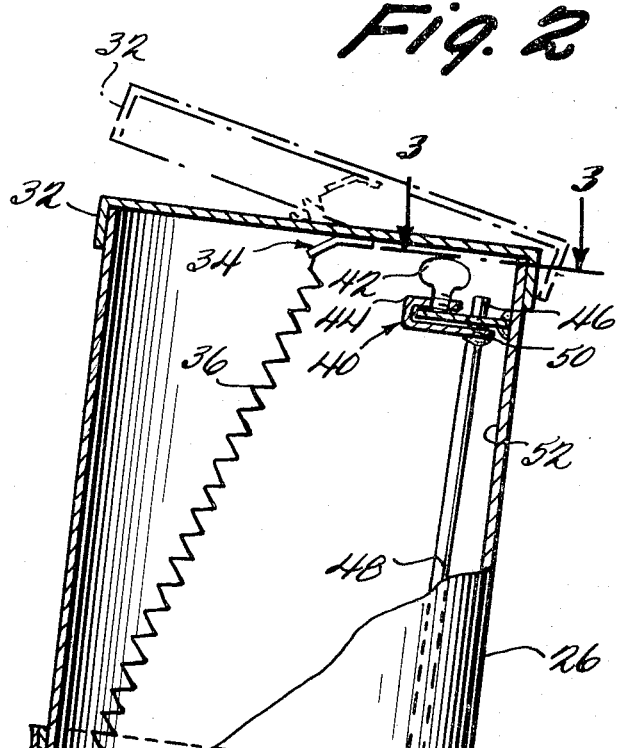
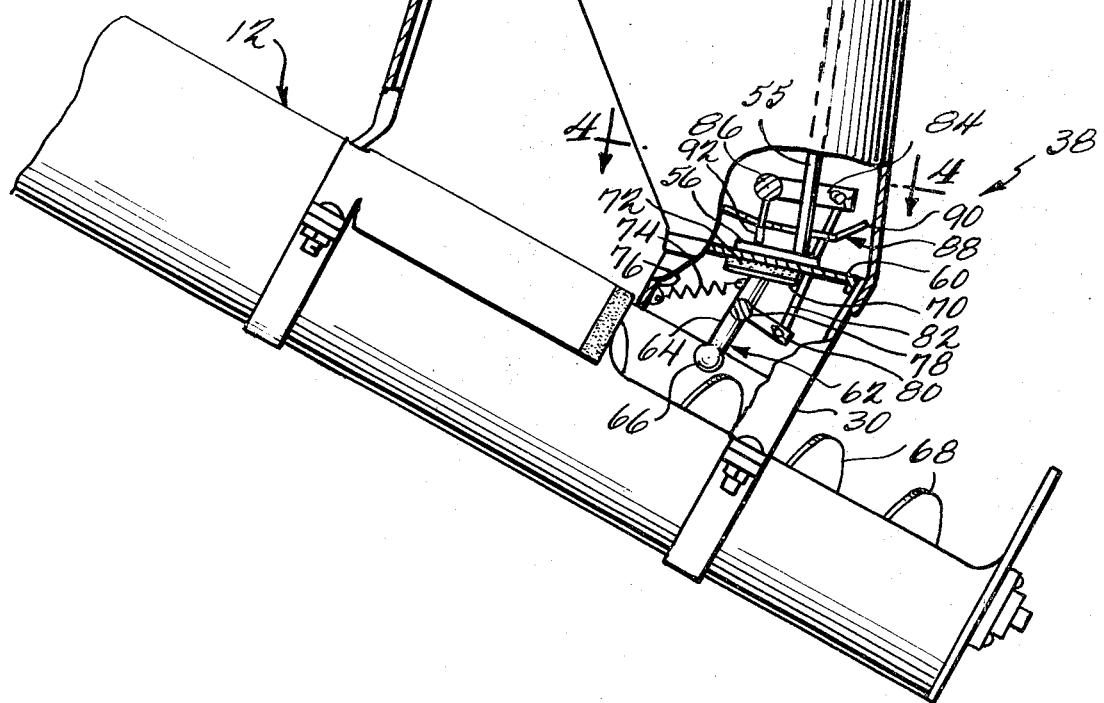
Fig. 2
Fig. 3

METERING APPARATUS

BACKGROUND OF THE INVENTION

This invention is directed to a hopper mechanism that is adapted to be mounted on a conveyor intake to dispense dry treatment substances to grain seed or other dry bulk materials being conveyed. It is desired by farmers and others engaged in the grain and seed business, to enhance the properties of and add protection to these dry materials by treating, fumigating or supplementing them with appropriate substances. An important aspect in this dry treatment is the accurate control of dispensing the treating substances, so as to insure proportionate processing of the seed and gain. However, prior art attempts to accurately and evenly meter the processing material has not resulted in a satisfactory and simple device.

BRIEF DESCRIPTION OF THE PRIOR ART

There have been numerous attempts in the prior art to provide a metering apparatus for a hopper mechanism so as to evenly and smoothly dispense a variety of dry bulk material to a conveyor. Typical of these prior art metering mechanisms is depicted in the patent to Scott et al., U. S. Pat. No. 3,485, 215. Scott et al. employs a metering device that includes a member that engages and rides the flights of an auger carried by an auger type conveyor to operatively open and close a path for feed. However, the opening and closing of the path is controlled by several turns of the auger, thereby creating long time intervals in which the feed is not discharged through an opening.

Further typifying other prior art attempts to provide apparatus to control the feed of dry material to a conveyor can be seen in the patent to Ransome, U. S. Pat. No. 490,631. In that patent there is disclosed a screw conveyor with a plurality of hoppers above it and arranged to be connected to a material flow controlling member. This member is driven by an eccentric cam that in turn is driven by a roller chain from the shaft driving the conveyor. However, the metering apparatus is more complicated in construction and operation as well as not being easily adaptable to be mounted to various size auger or screw conveyors.

The heretofore known metering apparatuses, used in combination with a hopper adapted to be connected to a conveyor fail to provide a simple structure that is capable of automatically dispensing treatment substances in an accurate, frequent and even state.

SUMMARY OF THE INVENTION

Accordingly it is an object of the instant invention to provide a simple and efficient metering apparatus for hoppers that automatically dispenses dry material to a conveyor in an accurate, frequent and even state.

It is another object of the invention to provide a metering apparatus that is synchronized to operate in conjunction with the revolutions of an auger or screw type conveyor.

It is a further object of the invention to provide a metering apparatus that includes a member adapted to detect the passage of auger flights and thereby open and close a gate to control flow of the treatment substance.

It is a still further object of the invention to provide a metering apparatus wherein the opening and closing of the gate is synchronized with each revolution of the auger to provide frequent dispensing of the treatment substance.

A yet further object of the invention is to provide a metering apparatus that includes a metering plate which is adjustable to regulate the gate passage with much accuracy.

An additional object of the invention is to provide a metering apparatus wherein the detecting member is also connected to an agitator and a wiper blade so as to ensure even dispensing of the substance through the gate.

It is a concomitant object of the invention to make provisions for easily mounting the hopper to various sized auger conveyors.

Other objects, advantages, and novel features of the invention will become apparent from the following detailed description of the invention when considered in conjunction with the accompanying drawings.

BRIEF DESCRIPTION OF THE DRAWINGS

FIG. 2 is a fragmented side elevational view partly in section illustrating the metering apparatus of the invention.

FIG. 3 is a view taken along section line 3—3 of FIG. 2 illustrating part of the adjustment device of the invention.

DESCRIPTION OF THE PREFERRED EMBODIMENT

Although the use of the metering apparatus will be described with reference to metering the flow of dry treatment substances for seed, in combination with a screw or auger type conveyor, it will be realized that the metering apparatus is susceptible to be used for metering other types of dry bulk material as well as used in combination with other type conveyors (e.g., paddle conveyors).

Figure 1:
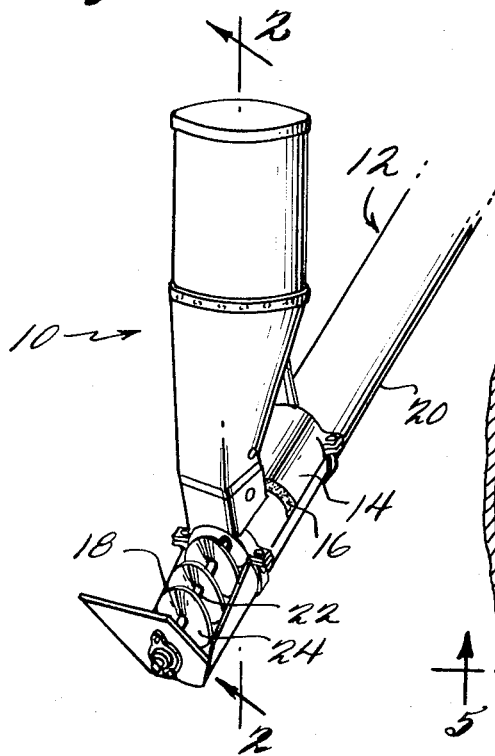
FIG. 1 is a perspective view of a hopper containing the invention, which is attached to an auger type conveyor.

Referring now to FIGS. 1–3, the instant invention is shown in an environment that includes a seed treater 10 connected to an auger conveyor 12 by mounting means 14. The mounting means is relatively springy and can be adapted to be positioned over the exterior of various size auger conveyors. A marking line 16 is placed upon the mounting means 14 so as to visually enable an operator to position the line at the beginning of an opening 18 in the auger tube 20. An auger shaft 22 is rotatably carried in the conveyor 12 and is driven by appropriate means (not shown). Carried by the shaft is an auger 24 which provides the transporting means for seeds as it moves in the conveyor 12.

As best viewed in FIG. 2 the seed treater 10 is comprised of cylindrical container 26 that houses various types of dry powdered treatment substances which will eventually be dispensed to mix with the seed. Attached by the use of conventional means to the lower end of the container is a hopper 28. The hopper is of the standard funnel shape and has secured thereto a hopper outlet 30 that directs the flow of dispensed substance into the auger opening 18. The container 26 has removable secured thereto a lid 32. The lid is provided with a tongue 34. This tongue accommodates one end of a lid spring 36 that is fastened at its other end to the inner wall of the hopper 28. The spring ensures a relatively tight engagement between the lid 32 and the top of the container 26 so as to keep the lid in position, whenever shocks and vibrations are imparted to the seed treater 10.

The invention is directed to the metering apparatus 38. The metering apparatus is comprised of several sub-assemblies, one of which includes an adjustment sub-assembly 40. This device consists of a turn screw 42, that is adapted to be received within an aperture (not shown) located in an indicator 44. The indicator is welded to one end 46 of a vertical rod 48. The rod end 46 is rotatably supported by an opening in a plate 50. The plate has a substantially half-moon contour and is welded to the internal wall 52 of the container 26. As seen in FIG. 3, numerical indicia 54 permits the user to selectively vary the flow of the dry treatment substance. The vertical rod 48 has attached thereto at its other end 55 a metering shutter 56. The shutter is directly responsive to follow the movement of the indicator 44 to thereby enable it to assume any of a number of positions over a gate 58. Gate 58 is located in the top wall 60 of the hopper outlet 30 and permits the discharge of dry treatment substances to the auger opening 18.

Figure 6:
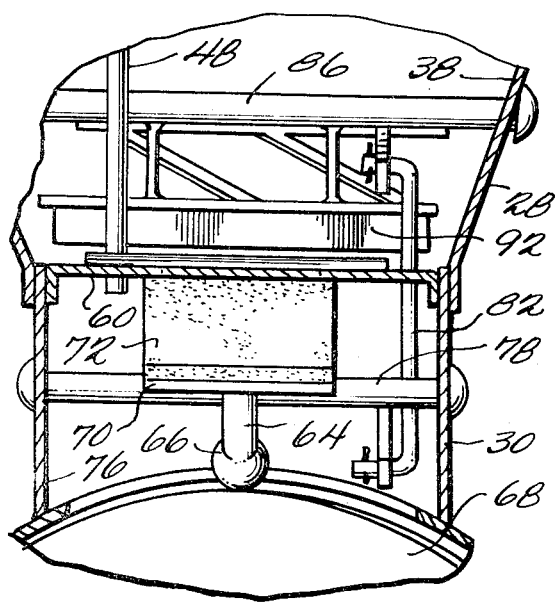
FIG. 6 is a view taken along section line 6—6 of FIG. 5 but showing a different view of the invention.
Figure 5:
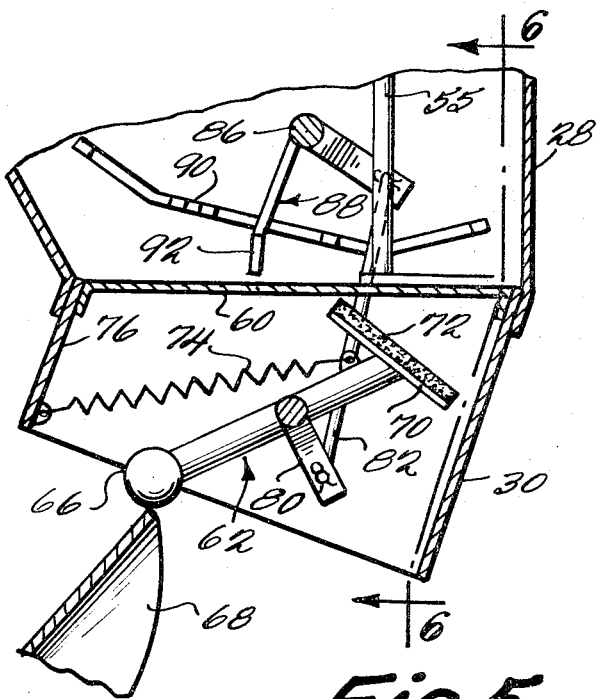
FIG. 5 is a view taken along section line 5—5 of FIG. 4 indicating but another view of the invention.

Now referring to FIGS. 2, 5 and 6 the metering apparatus 38, also, includes a synchronizer sub-assembly 62. Formed integral with the sub-assembly is a rocker leg 64 having at one end thereof a ball 66 which contacts and follows the path of movement produced by the rotation of the auger flight 68. At the other end of the rocker leg 64 is a plate 70. Adhesively bonded to this plate is a pad 72 that can be made of any suitable material. A return spring 74 is connected to the leg and to the internal walls 76 of the hopper outlet 30. This spring will urge the pad into a position as illustrated in FIG. 2, (i.e., to cover the gate 58) thereby blocking the flow of dispensing material. The pad is permitted to move due to the connection between the leg 64 and a pivot pin 78. The pivot pin extends transversely across the outlet housing 30, and is pivotally attached at both ends thereof, to the internal walls 76. A crank arm 80 extends from the pin 78 and is fastened to a connecting rod 82. Connecting rod 82 in turn passes through the top wall 60 and is appropriately fastened to a link 84. The link is secured to a shaft 86 that extends transversely across hopper 28. The shaft is rotably mounted to the inner wall of the hopper 28. By means of this linkage arrangement with the pin 78, the shaft will be able to move in unison with movement imparted to the pin by the auger flight 68.

Figure 4:
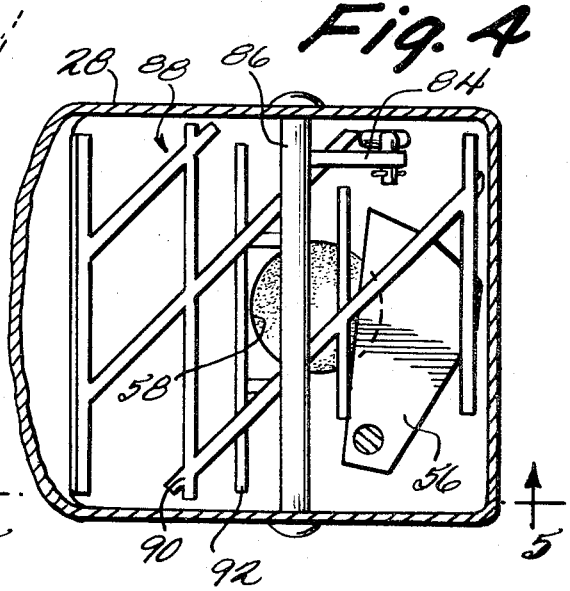
FIG. 4 is a view taken along section line 4—4 of FIG. 2 depicting but another feature of the invention.

In order to ensure an even dispensing of the treatment substance, the metering apparatus 38 as best seen in FIGS. 4-6 includes an agitator sub-assembly 88. This sub-assembly includes an agitator 90 fixedly mounted to shaft 86. A wiper blade 92 is further secured to the agitator 90 by appropriate means. As the shaft pivotally moves in response to the passage of the flights 68 of the auger, a rocking motion is imparted to the agitator and blade. This action tends to break up any bridges that might start to form across the gate 58 and also loosen any accumulations of dried substance found about the walls adjacent to the gate.

MANNER OF OPERATION

In its preferred embodiment, the metering apparatus 38 of the invention operates in an extremely simple manner. The operation is begun by the seed treater 10 being fixedly mounted to a conveyor 12 through the agency of mounting means 14. As the auger shaft 22 rotates the flights 68 of the auger also rotate. This screw type rotation imparts a generally linear movement to the seeds, which is necessary to transport the seeds along the auger tube 20.

As the auger flight moves, the synchronizer subassembly 62 of the metering apparatus functions. Such operation is best viewed in FIG. 2, wherein pad 72 is urged by a return spring 74 into a position that blocks the exiting of dispensing material. As aforementioned, the ball 66, contacts and follows the passage of the auger flight 68. The force transmitted to the ball by the auger flight is sufficient in magnitude to overcome the bias of the return spring and move the pad generally downwardly away from gate 58. This downward motion to an opening position (FIG. 5) is brought about by the connection between the rocker leg 64 and the pivoting pin 78 mounted in the outlet housing 30. Since the gate is now open, the dry treatment substance contained in the hopper 28 is free to fall onto the seed being conveyed. The opening and closing cycle of the gate by the movement of the pad will continue as long as the auger shaft rotates. For each revolution of the auger flight there will be a corresponding opening and closing cycle of the gate. Thusly, the dispensing of the dry substance will occur at frequent intervals, thereby preventing a disproportionate distribution of the seed.

As aforenoted, the metering apparatus 38 further includes the adjustment sub-assembly 62 and the agitator subassembly 88. Both of them provide for accurate and uninterrupted dispensing. The adjustment sub-assembly 40 as seen in FIGS. 2-4, allows the opeator to selectively vary the location of the shutter 56 relative to the gate, by positioning the indicator 44 at different settings on the metering plate. This variation is accomplished by simply rotating the turnscrew 42 so as to unlock the indicator from the metering plate 50, and then sliding the indicator to a different setting. As the indicator 44 slides to new settings on the metering plate, the shutter follows the motion of the indicator to various locations relative to the gate 58. When a new setting is reached, indicating the desired quantitative rate of material to be dispensed, the turn screw is manipulated to lock the indicator at this setting. Thusly, a simple yet efficient adjustment device is provided that further adds to the overall accuracy of the metering apparatus 38.

As more clearly shown in FIGS. 4-6, the agitator subassembly 88 comprising the agitator 90 and the wiper blade 92 function contemporaneously with the operation of the synchronizer sub-assembly 62. As the pivot pin rotates due to its operative connection with the passage of the auger flights 68, the crank arm 80 associated with the pin 78 will cause the connecting rod 82 to reciprocate in a vertical direction. This vertical translation of the connecting rod imparts motion to the link 84. The link in turn causes the transverse shaft 86 to pivot in a to and fro manner in response to the motion of the pin. The net effect of this to and fro movement is to create a rocking type action of the agitator and the wiper blade. The interaction between the agitator and blade with the powdery dry treatment substance, promotes a breaking apart and loosening up of the powder about the gate 58. Therefore, every time the pad is in an open position, a continuous uninterrupted and even gravity feed of the powder will occur through the gate.

There is thus provided by the present invention an improved automatic metering apparatus in a seed treater for distributing accurate, frequent and uninterrupted even flow of treatment substances for seeds. The apparatus is also provided with mounting means which is adaptable to be accommodated to various size augers. Although the invention has been described with reference to one particular embodiment, it will be readily apparent to those skilled in the art that various other modifications may be made without departing from the inventive concept. It is therefore intended by the appended claims to cover all such modifications which fall within the scope of the invention.

What is claimed is:

1. An automatic metering apparatus in combination with a treater for dispensing a treatment substance wherein the metering apparatus and the treater are connected to a conveyor to thereby expose conveyor means thereto, the metering apparatus comprising:
    A. a synchronizer means that includes an arm mounted for movement in the treater between two positions, the arm having a contact member and oppositely arranged therefrom a cover member, the cover member is urged to a first of the two positions, by biasing means to block an opening in a wall of the treater, the contact members abuts and synchronously follows movement of the conveyor means, wherein the conveyor means imparts a force to the contact member to overcome the urging of the biasing means and move the cover member to a second of the two positions, whereby the opening is unblocked to permit gravity flow dispensing of the substance, the movement of the conveyor means also permitting return of the cover member to the first of the two positions,
    B. an adjustment means that includes an indicator connected to the treater and adapted to vary positions of a shutter relative to the opening and thereby quantify the flow of the substances through the opening,
    C. an agitator means operatively connected to the synchronizer means, so as to move contemporaneously therewith, the agitation movement causing a loosening of the substances thereby providing an uninterrupted flow thereof through the opening.

2. An automatic metering apparatus as set forth in claim 1 wherein the conveyor means are auger flights.

3. An automatic metering apparatus as set forth in claim 1, wherein the agitator means comprises an agitator and a wiper blade.

4. An automatic metering apparatus as set forth in claim 1, wherein the mounting means has springiness so as to be adapted to be attached to various sized conveyors.

5. An automatic metering apparatus as set forth in claim 4, wherein the mounting means has a marking line thereon so as to facilitate the attaching of the mounting means to various sized conveyors.

6. An automatic metering apparatus as set forth in claim 2, wherein the movement of the auger flight is a screw type movement.

7. An automatic metering apparatus as set forth in claim 2, wherein the cover member movement between the first position and back again is accomplished by a single revolution of the auger flight.

* * * * *